United States Patent
Vrionis et al.

(10) Patent No.: US 6,329,783 B1
(45) Date of Patent: Dec. 11, 2001

(54) APPARATUS FOR CONTINUOUSLY VARIABLE SPEED ELECTRIC MOTOR APPLICATIONS

(75) Inventors: Nickolas G. Vrionis, Los Altos; Ronald L. Eichorn, Soquel, both of CA (US)

(73) Assignee: Gas Research Institute, Chicago, IL (US)

( * ) Notice: Subject to any disclaimer, the term of this patent is extended or adjusted under 35 U.S.C. 154(b) by 0 days.

(21) Appl. No.: 09/475,687

(22) Filed: Dec. 30, 1999

(51) Int. Cl.[7] .................................................. H02P 7/62
(52) U.S. Cl. ........................ 318/772; 318/774; 318/781
(58) Field of Search ................................. 318/767, 771, 318/772, 773, 774, 776, 778, 779, 781

(56) References Cited

U.S. PATENT DOCUMENTS

| | | | |
|---|---|---|---|
| 3,582,737 | * 6/1971 | Brown et al. | |
| 4,443,749 | * 4/1984 | Douthart et al. | 318/774 |
| 4,467,257 | * 8/1984 | Douthart et al. | 318/774 |
| 4,477,760 | * 10/1984 | Kuznetsov | 318/773 |
| 4,779,034 | 10/1988 | Shepard, Jr. | 318/804 |
| 5,614,799 | * 3/1997 | Anderson et al. | 318/439 |
| 5,650,707 | * 7/1997 | Lipo et al. | 318/773 |
| 5,675,230 | * 10/1997 | Dunfield | 318/772 |
| 5,680,021 | 10/1997 | Hollenbeck . | |
| 5,867,005 | 2/1999 | Brown | 318/751 |

FOREIGN PATENT DOCUMENTS

3607162-A1 * 9/1987 (DE) .
4222431-A1 * 1/1994 (DE) .

OTHER PUBLICATIONS

Joseph D. Law and Thomas A. Lipo: *A Single Phase Induction Motor Voltage Controller with improved Performance*, IEEE Transactions on Power Electronics, vol. PE–1, No. 4, 240–247, Oct. 1986.

M.M. Marcos et al.: *A Solid–State Speed Controller for Capacitor Motors Driving Ventilation Fans*, IEEE Transactions on Industry Applications, vol. 30, No. 3, 656–663, May 1994.

* cited by examiner

*Primary Examiner*—Bentsu Ro
(74) *Attorney, Agent, or Firm*—Pauley Petersen Kinne & Fejer

(57) ABSTRACT

An electric motor and its controller are specially adapted for variable speed applications. The stator of the motor has its main windings controlled by triacs. The triacs are placed to allow the main windings to operate in series at low speed and in parallel at high speeds. The firing delay of the operating triacs is controlled in both series and parallel winding operations to aid in smooth operation of the motor. The auxiliary winding is preferably left uncontrolled to contribute a regular sinusoidal component to the windings power at all times. The controller receives the speed command and figures firing delay and outputs triac control pulses at one of a plurality of settings to bring the motor to the selected speed. In this manner a simple, inexpensive, and continuously variable speed motor may be realized with good performance characteristics.

24 Claims, 6 Drawing Sheets

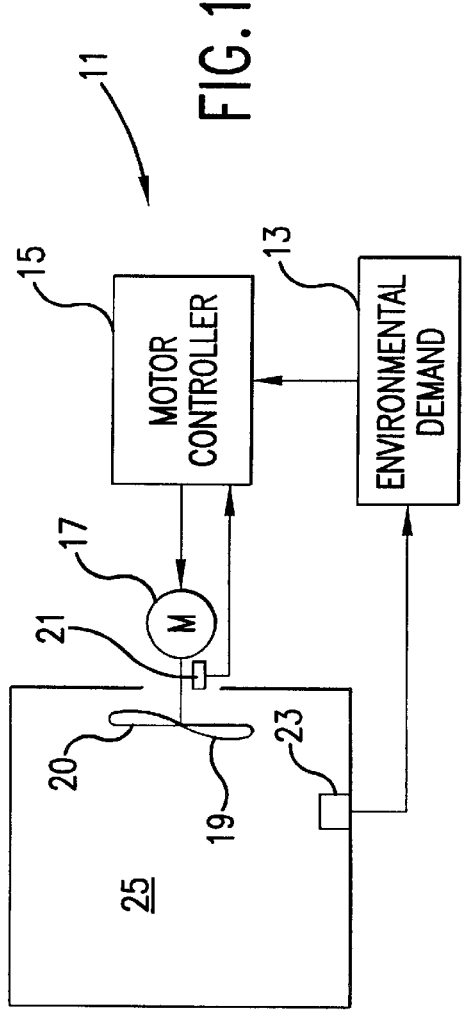
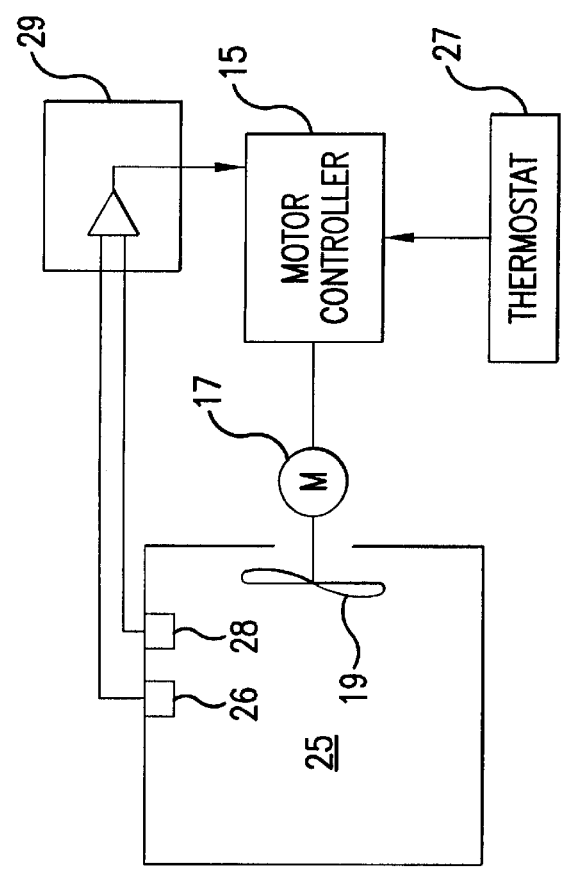

APPARATUS FOR CONTINUOUSLY VARIABLE SPEED ELECTRIC MOTOR APPLICATIONS

BACKGROUND OF THE INVENTION

1. Field of the Invention

The present invention relates generally to electric motors. The present invention relates more specifically to induction motors utilized in applications demanding a range of variable speeds.

2. Discussion of the Related Art

Many applications for electric motors demand variable speeds with a known load on the motor. For example a blower motor in a household heating, ventilation and air-conditioning (HVAC) system will typically be a fractional horsepower motor driving a blower unit or fan blade which represents a known load varying regularly by speed in revolutions per minute.

Inexpensive induction motors are desirably utilized in many applications. These motors are not particularly well adapted for variable speed usage. Rather they are designed to operate efficiently only at one best speed and inefficiencies result when trying to run the motor at other than the designed speed. However, many systems, such as the above HVAC applications, would benefit greatly from having a wider range of motor speeds available.

In the past art, a variable range of speeds from one induction motor was obtained through the use of expensive controllers changing the frequency and voltage of the input to the motor windings or by using a multi-tap motor to attain a number of fixed selectable speeds by mechanical switching between the taps.

Expensive controllers such as these were necessary because, as the input to the motor windings strays farther from sinusoidal, motor efficiency and power factor drop while total harmonic distortion rises, resulting in unacceptable noise, heat, efficiency loss, and motor life.

Thus, known motor controllers utilizing inexpensive switching mechanisms, such as triacs, to control power to the motor windings by "chopping" the sinusoidal waveform input were thought to be of limited use in applications of continuously variable motor speed control.

In an article entitled "A Single Phase Induction Motor Voltage Controller with Improved Performance", J. D. Law, T. A. Lipo, *IEEE Transactions on Power Electronics*, Vol. PE-1, No. 4, October 1986, pp 240–247; triac control of paired main and auxiliary windings is suggested to run the pairs first in series then in parallel to maintain constant motor speed as the load varies from a low to a high, or fully rated, load. A constant firing delay angle based on empirical study is input to the triac controller using DIP switches. The phase delay is measured with a voltage zero crossing detector and zero current detector. The current hold off angle is then computed and adjusted to make the phase delay and current hold off equal to the predetermined firing delay to maintain constant rated or near-rated speed under the varying load conditions to maintain as closely as possible the full speed the motor was designed for.

The present invention is rather concerned with the opposite effect of obtaining reasonably efficient variable speed for a load of known characteristics with a low cost induction motor and controller system.

SUMMARY OF THE INVENTION

In a variable speed motor application a particular motor speed is called for according to an environmental demand placed on the motor function e.g. moving air or other compressible fluids. For example, a thermostat may determine that more conditioned air needs to be moved in a ventilation system, thus requiring an increase in blower unit rotation and concurrent motor speed.

The controller decodes the speed demand signal and determines if the main windings should operate in series or in parallel configuration. It also determines the firing rate or delay angle, of the triacs to achieve the desired motor speed and greatest motor efficiency at the expected load. The auxiliary windings are preferably left unswitched to provide a constant sinusoidal component to the input power in order to increase power factor, and lower total harmonic distortion in the motor and thereby increase efficiency and reduce noise and heat.

The present invention provides an inexpensive system for obtaining variable speed electric motor operation over known load ranges. The stator main windings of the motor are switch-controlled, preferably by triacs, in an exclusive OR function, to run in series at lower speeds and in parallel at higher speeds. The switch point between parallel and series operation is determined empirically according to the motor usage, or load, and designed into the motor controller in the form of memory such as a look-up-table or by calculable result of an algorithm. Because the load of a blower varies in known relation to the speed of the motor, the slip can be determined and controlled by adjustment of the firing delay angle of the triacs with use of only a zero crossing voltage detector for feedback.

Where fine adjustments are necessary, a tachometer may be added as a motor speed feedback to the controller to ensure continuously variable speed adjustments. Where available, the tachometer may also be used to determine the switch point between series and parallel main winding operations.

BRIEF DESCRIPTION OF THE DRAWINGS

FIG. 1 is an overview of a system utilizing a variable speed induction motor according to the present invention.

FIG. 2 is an alternate embodiment showing a 2-stage environmental demand apparatus.

DETAILED DESCRIPTION OF THE PREFERRED EMBODIMENTS

Figure 3:
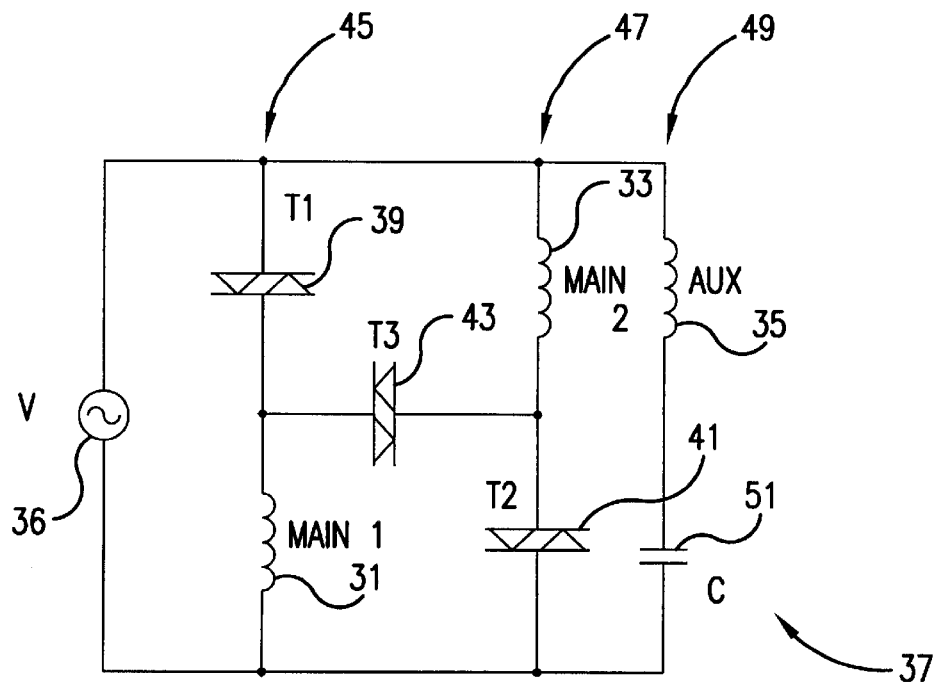
FIG. 3 is a schematic illustration of the stator windings and triac placement thereon.

Referencing FIG. 1, an operational system 11, such as an HVAC system, has speed demand system 13 derived from environmental sensing and control units such as a thermostat or other furnace control apparatus; a motor controller 15 for accepting input from the environmental demand system 13 and outputting control signals to a motor 17 which drives a load 19, such as a blower unit, fan blades or other compressible fluid moving mechanisms as represented in FIG. 1 by a fan blade 20. A tachometer 21 such as a Hall effect device or other known angular speed measuring means is placed to measure motor speed and report the speed information back to the motor controller 15.

The speed demand system 13 is illustrated as having a temperature probe 23 in an air plenum 25 for its sensing unit upon which the speed demand for the motor 17 would be determined and communicated to the motor controller 15. Various known demand systems and operations may be used in the system of the present invention.

Alternatively, referencing FIG. 2, it will be appreciated that an external environmental control unit such as a thermostat 27 may only give the motor controller an on/off signal at which point an internal or separately placed, speed demand system 29, such as one having differential temperature sensors 26, 28 located within the plenum 25, may determine the speed requirements for the motor 17 and report them to the motor controller 15.

Figure 7:
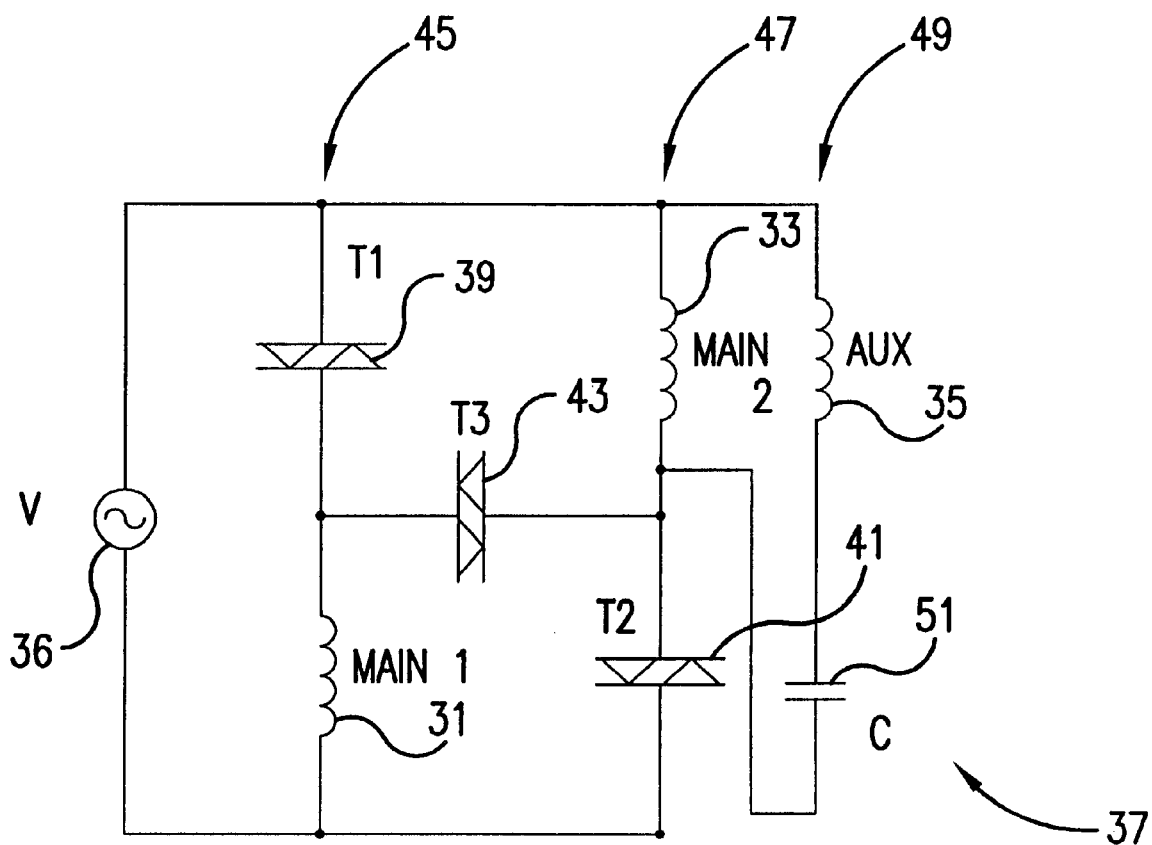
FIG. 7 is a schematic showing alternative winding arrangements.

Referencing FIG. 3, first and second main windings 31, 33, respectively, and auxiliary winding 35 of the motor 17 are shown connected across a voltage supply 36 as parallel legs 45, 47, 49 respectively of the stator circuit 37 of the motor. The windings 31, 33, 35 need not have an equal number of turns, as illustrated in FIG. 7. Any or all of the main and auxiliary windings may have an unequal number of turns selected to provide the greatest motor efficiency when operating the motor at a given speed and in a given mode. First and second main windings 31, 33 have first and second triac 39, 41, respectively, at opposing ends of their parallel legs. A third triac 43 provides a switchable path between the main winding parallel legs 45, 47 to provide in-series operation of the main windings by operating the third triac 43 while the first and second triacs 39, 41 are not operational. While the auxiliary winding leg 49 is shown with a constant capacitor 51, it is envisioned that any known arrangement of start and run capacitors may be utilized with the present invention. The auxiliary winding 49 is preferably left in parallel with the main windings to provide a constant sinusoidal component to the total power in the windings.

Figure 4:
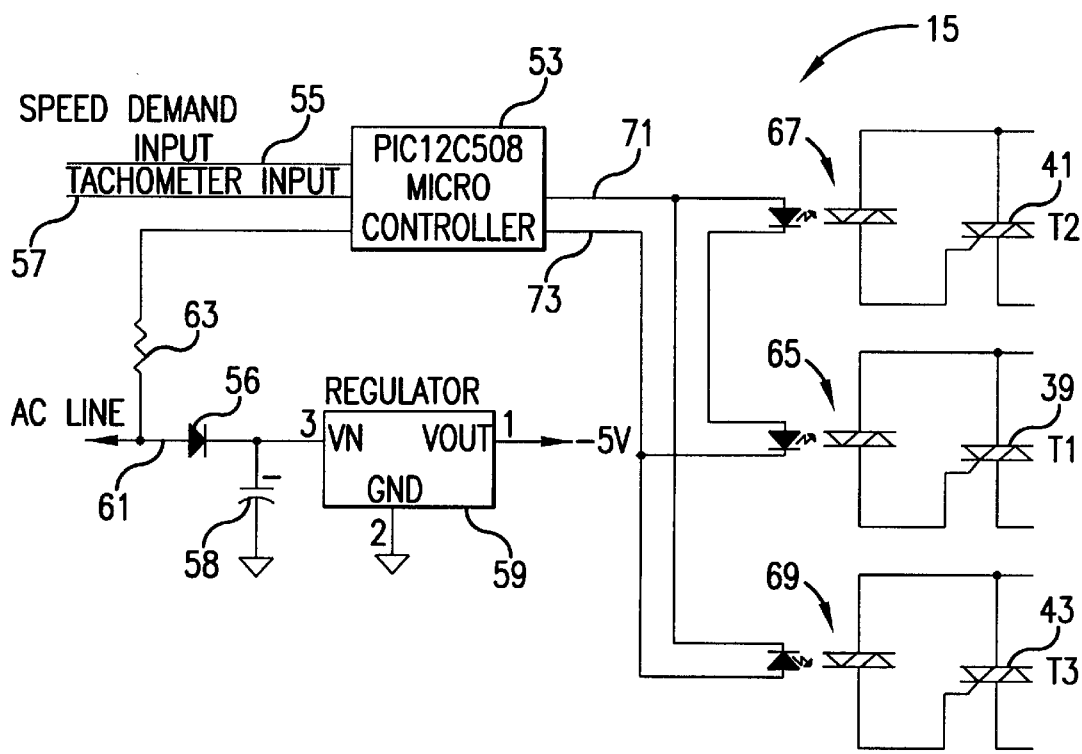
FIG. 4 is a schematic of the motor controller according to a preferred embodiment of the invention.

Referencing FIG. 4, the motor controller 15 comprises a microprocessor or programmable microcontroller 53 with an internal oscillator, accepting a speed demand 55 input from the environmental demand unit 13 and a tachometer input 57 from the tachometer 21; a rectifying diode 56, a filter capacitor 58, a voltage regulator 59 across AC line power 61, a resistor 63 for establishing zero voltage detection to the microcontroller 53, and first, second, and third opto-isolators 65, 67, 69 for control inputs to the respective first, second and third triacs 39, 41, 43.

The microprocessor 53 is preferably a low power device such as model No. PIC 12C508, available from Microchip Technology Inc., of Phoenix, Ariz., which draws on the order of 1–2 mA. The voltage regulator 59 is also a lower power device preferably drawing less than 1 MA such as part no. VB408 from ST Microelectronics (www.st.com), and the opto-isolation units 65, 67, 69 such as part No. MOC 3023 from QT Optoelectronics Co. of Sunnyvale, Calif., are also low power devices operating at 5 mA. By selecting lower power devices, load current of the controller is low and the IR drop required is low resulting in little wasted power or heat thereby allowing the present invention to generate low voltage by regulating the rectified AC power line 61 and thus saving the cost of a transformer. Alternately, a resistor divider from the power line may be used to lower the voltage, with about one watt of additional power loss, so that a low voltage regulator may be used.

The LEDs of the opto-isolators, or optically coupled trigger devices 65, 67, 69 are driven by a first and second output lines 71, 73 from the microcontroller 53. The serial winding operation triac trigger device 69 is connected in opposite polarity to the parallel winding operation trigger devices 65 and 67. Thus, the parallel trigger devices 65, 67 are exclusively OR'ed with the serial trigger device 69. If both microprocessor outputs 71, 73 are equal all triacs 39, 41, 43 are off. If the first output 71 is high, the parallel winding operation triacs 39, 41 will conduct. If the second output 73 is high, the serial winding operation triac 43 will conduct. Thus, so long as when transitioning between series and parallel winding configuration modes, an operating triac is forced or allowed to have its load current go through zero, i.e. turn off, before selecting the next winding configuration mode, no condition can operate both modes simultaneously. Thus, there is no danger during power up or software failure of a short across the power line drawing excess current and damaging the triacs 39, 41, 43.

Figure 6A:
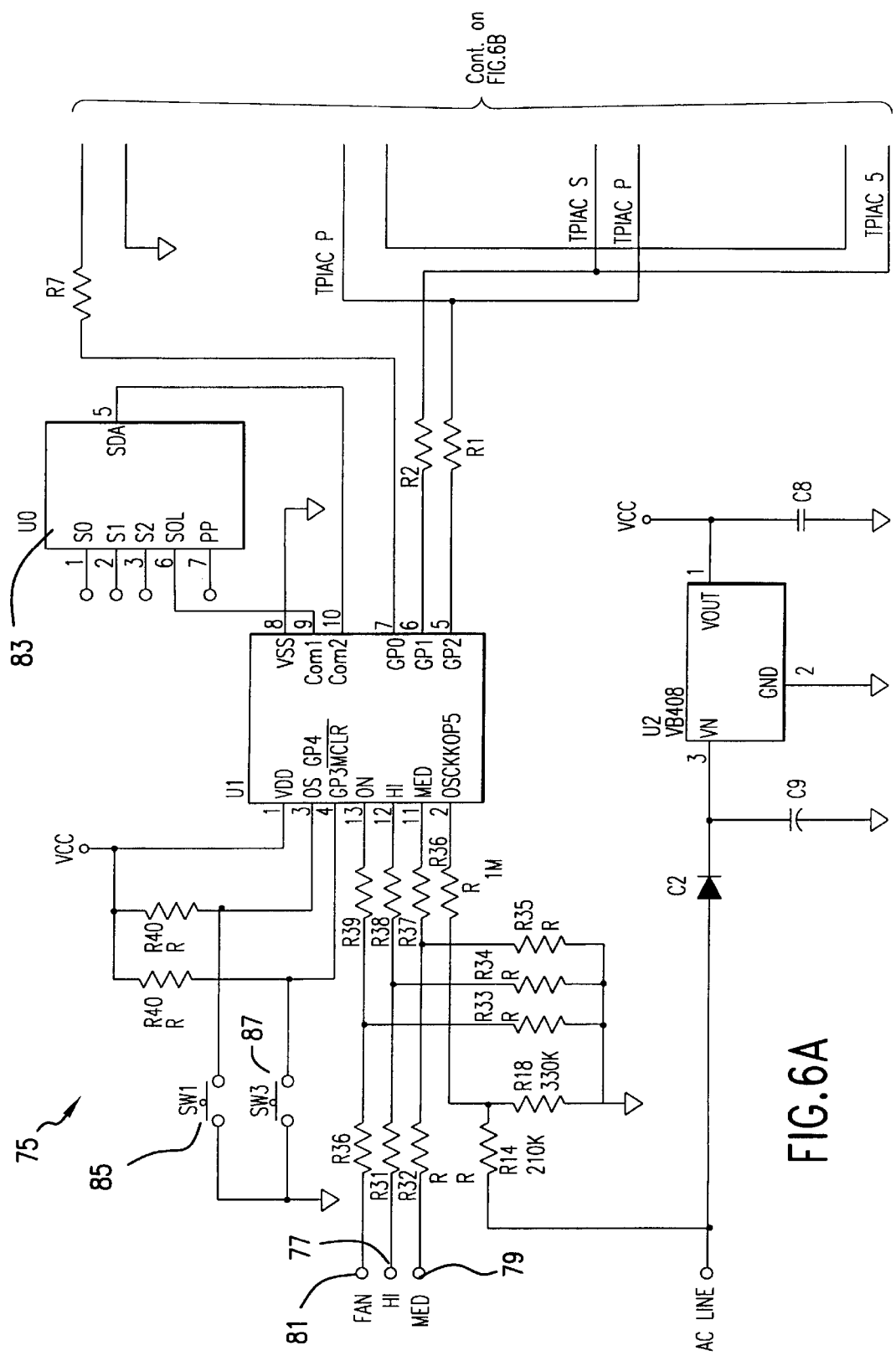
FIG. 6 is a schematic of an alternative motor controller showing triac control of the auxiliary winding.
Figure 6B:
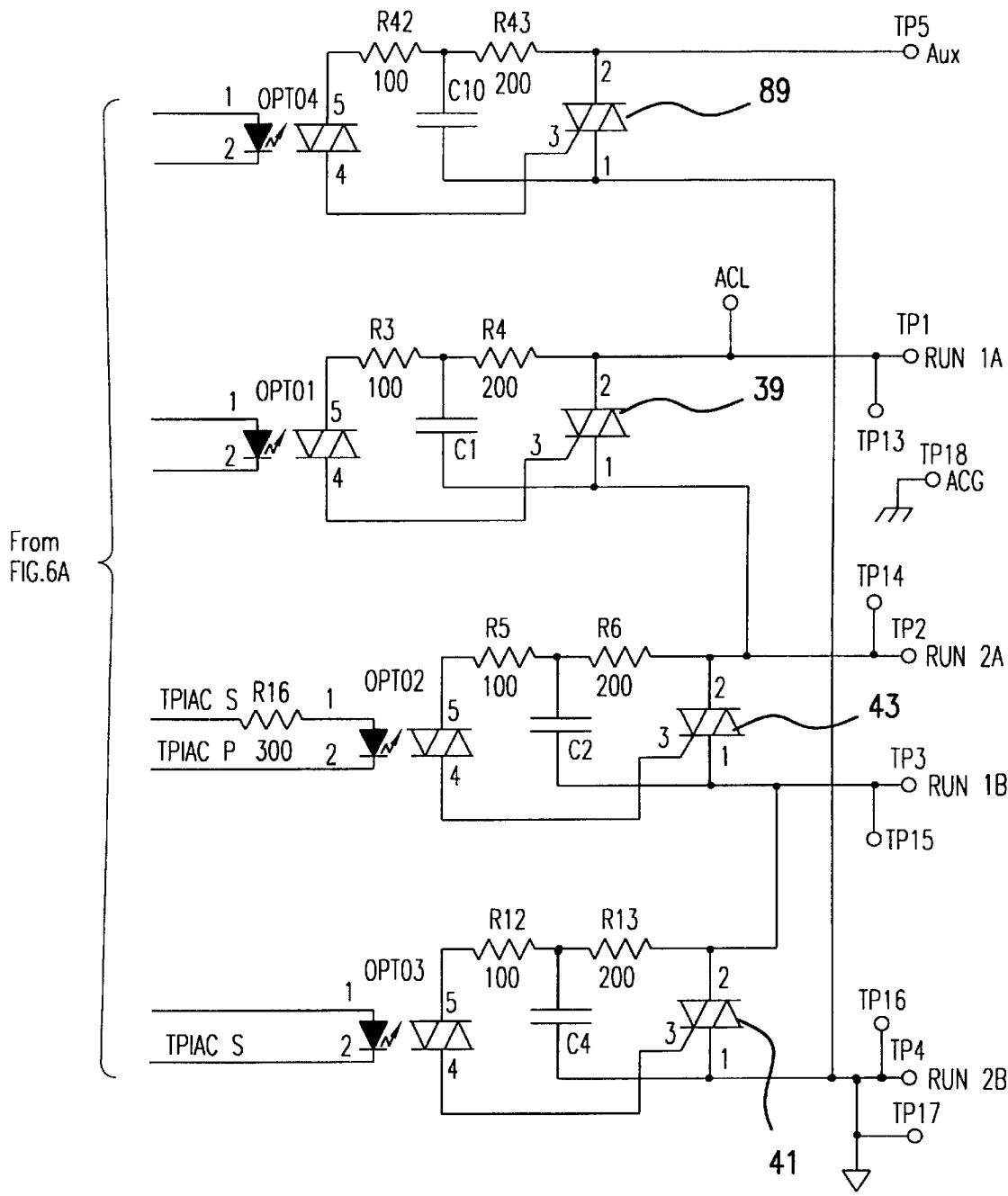

Referencing FIG. 6, in an alternative embodiment, a motor controller 75 is easily connectable to a conventional furnace as is manufactured in volume today. A furnace controller, or environmental demand system, has two 120VAC inputs to the motor controller. If the first input 77 is high, i.e. 120VAC present, this corresponds to the furnace being in the air conditioning mode. In the air conditioning mode the demand is for the fan to be at or near, i.e. substantially, the maximum motor speed. If the second input 79 is high, this corresponds to the furnace being in the heating mode, and asking the fan to be at a preset speed within the range of about sixty to ninety percent of maximum speed. There is a third input 81 coming from a thermostat having a fan switch. This is usually a 24VAC signal and will ask the furnace to recirculate the air at a preset speed in the range of about 300–600 rpm, or twenty five to fifty percent of maximum. If the thermostat is in this recirculation mode, and either the first input 77 or second input 79 goes high, the third input 81 will be overridden.

To make the motor installation easy for the installer, the motor controller may have a EEPROM 83 with a preset variety of motor speeds for selection of the proper speed setting for each of the above discussed modes of the furnace. The furnace is placed in one of the three operating modes, and the installer then presses an up button 85 or down button 87 to increase or decrease the motor speed. Once the proper speed is selected, that speed setting is locked in, or set, for that operational mode. The setting is kept in EEPROM for the controller to use indefinitely. Then the furnace is changed to the next mode and the process is repeated until all three modes are set. Thus in this alternative embodiment, the motor is variable over a wide range of speeds but has only two or three widely spaced motor speed settings. Where large changes in motor speed are to occur between speed settings, there may be software controlled power cycle removal for a small number of cycles, especially as between high speeds and lower speeds, in order to allow the motor to slow thus preventing current surges when starting operation of the motor at the lower speed. When going from a low speed to a high speed, power cycle removal should be only long enough to protect the triacs without causing undue current surge at the switch to higher speed operation.

When it is required for the motor to be off, and the auxiliary winding is placed across the AC line with no preceding way to shut off the line power, a fourth triac 89 is placed in series with the auxiliary winding and is turned off when all three of the main winding triacs 39, 41, 43 are off. Alternatively, one may place the auxiliary winding across one of the run windings as seen in FIG. 7. This would eliminate the need for the fourth triac but may result in decreased motor performance.

A switch point for determining series and parallel winding operations is empirically selected for the motor system between two numbers on the speed setting scale. In the present example with twenty four speed settings, the switch point may e.g. be between twelve and thirteen with twelve or less being series windings operation and thirteen or greater being parallel windings operation. The switch in motor operation need not occur at fifty percent of motor speed and can be different for different constructions and arrangements of motors. For example, it has been found that high speed series operation of the windings is more efficient than low speed parallel operation of the windings. Therefore when in that range of speed settings, the operator may wish to push the series windings operation settings to a higher percentage of the rated motor speed before changing operation to parallel windings, perhaps to as much as seventy plus percent of rated speed.

When the motor is operating near the switchpoint, hysteresis should be provided in order to minimize the number of changes in operation mode between series and parallel. In the preferred embodiment software supplied hysteresis serves to prevent chatter at operational points close to the switch over point. Opto-isolation prevents back EMF from stressing the controller or the triacs. As an added precaution, delays in switching may be programmed, e.g. power may be turned off for one or more half cycles between series/parallel transitions to prevent any possible shorting of the triacs 39, 41, 43 across the line.

Figure 5:
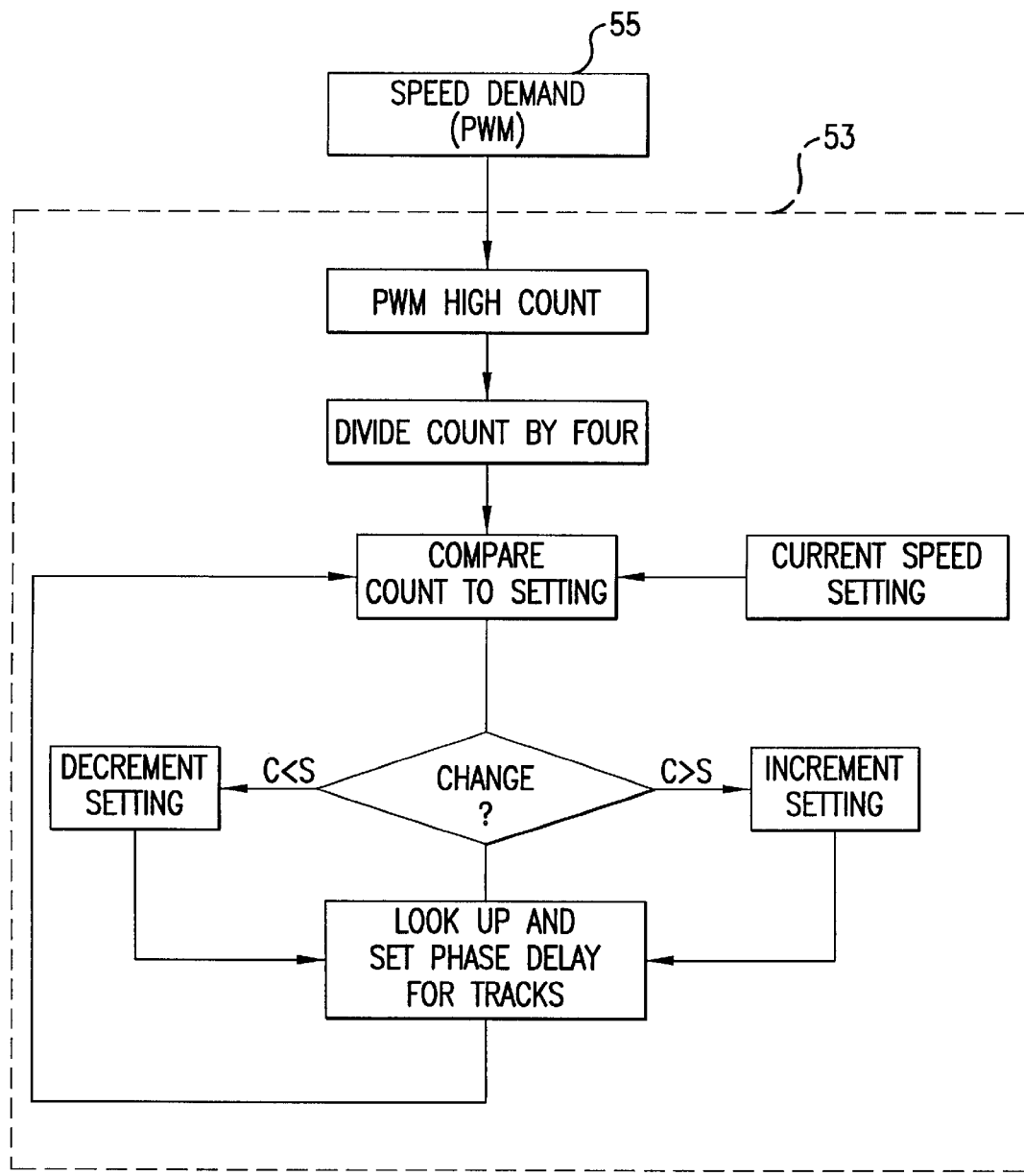
FIG. 5 is a flow chart detailing the series/parallel switching and firing delay adjustment operation of the controller.

Referencing FIG. 5, the speed demand input 55 is sent to the microprocessor 53. The speed demand input 55 may, for example, be a pulse width modulated (PWM) signal although other forms of input may be accommodated. The microprocessor 53 counts the PWM high cycle, i.e. decodes or translates, the speed demand input to a speed setting number level usable by the microprocessor and compares it to the current speed setting. The number of speed settings is limited only by the microprocessor capability, but in the present embodiment is preferably between two and one thousand twenty four choices, inclusive, which is believed to be adequate for most variable speed applications. In the present embodiment the PWM count is divided by four to limit the number of speed setting number level choices. If the speed setting level is greater than the current speed setting, the speed setting is incremented. If the speed setting level is less than the current speed setting, the speed setting is decremented. When a new speed setting is established, it serves as index number for a look-up table returning the triac to be operated and the appropriate phase delay timing for that speed. Separate tables may be used for series operation and parallel operation. Alternatively, the phase delay may be calculated according to an equation such as for a speed to load curve or speed to firing delay curve contained within the microprocessor.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. Apparatus for obtaining a variable speed motor operation comprising:
    a. a rotor surrounded by a stator and connectable to a load;
    b. the stator having main windings controlled by switching mechanisms connected thereto for control of current through the main windings;
    c. the switching mechanisms for control of current through the main windings being configured to run the main windings in a series or in a parallel configuration;
    d. the firing rates of the switching mechanisms for control of current through the main windings being variably set by a controller to determine the speed of the motor and the series or parallel configuration operation of the main windings;
    e. the controller connected to a speed demand unit for input of motor speed commands to the controller;
    f. whereby, the controller varies the firing rate of the switching mechanisms for control of current therethrough in both series and parallel operation of the main windings according to the motor speed command from the speed demand unit to yield a variable speed motor.

2. The apparatus according to claim 1 wherein at least two sets of windings have different numbers of turns selected to be in a ratio favorable for motor efficiency at a selected speed setting and operation mode of the windings.

3. The apparatus according to claim 1 wherein the firing rate is determined by lookup table.

4. The apparatus according to claim 1 wherein the firing rate is determined by calculation in the controller.

5. The apparatus according to claim 1 wherein the controller is digital and has a plurality of choices of firing delay angles.

6. The apparatus according to claim 1 wherein the controller is digital and has between 2 and 1024 choices of firing rates.

7. The apparatus according to claim 1 wherein there is hysteresis programmed in when switching between series and parallel configurations.

8. The apparatus according to claim 1 wherein there are power cycles dropped out when switching between speed settings.

9. The apparatus according to claim 1 wherein the controller has a voltage zero crossing detector.

10. The apparatus according to claim 1 wherein the load is a fan blade.

11. The apparatus according to claim 1 wherein the apparatus is an HVAC unit.

12. The apparatus according to claim 1 wherein the switching mechanisms are biased to provide failsafe switching.

13. The apparatus according to claim 1 wherein the switching mechanisms are triacs.

14. The apparatus according to claim 1 further comprising a tachometer for providing speed measurement feedback to the controller.

15. The apparatus according to claim 1 wherein the motor is operated in the series operation at over one half its rated speed.

16. Apparatus for obtaining a variable speed motor operation comprising:
    a. a rotor surrounded by a stator and connectable to a load;
    b. the stator having main windings controlled by switching mechanisms connected thereto for control of current through the main windings;
    c. the switching mechanisms for control of current through the main windings being configured to run the main windings in a series or in a parallel configuration;
    d. the firing rates of the switching mechanisms for control of current through the main windings being variably set by a controller to determine the speed of the motor and the series or parallel configuration operation of the main windings;

e. the controller connected to a speed demand unit for input of motor speed commands to the controller;

f. whereby, the controller varies the firing rate of the switching mechanisms for control of current therethrough in both series and parallel operation of the main windings according to the motor speed command from the speed demand unit to yield a variable speed motor; and g. auxiliary windings in the stator being in parallel with the main windings and receiving unswitched line current.

17. A method of operating an induction motor comprising:

a. providing a rotor, a stator, and a load of known characteristics;

b. arranging the coils of the stator in main and auxiliary windings;

c. arranging first and second main windings in parallel with a power supply, each parallel winding leg being controlled on an opposing end thereof by a respective first and second triac, and providing a third switchable triac in a series path between the main windings;

d. accepting a speed demand signal and translating said speed demand signal to a speed setting number;

e. looking up at least one operational parameter for the triacs based on said speed setting number;

f. controlling the triacs whereby when the third triac is operational the first and second triacs are not operational and when the first and second triacs are operational the third triac is not operational, to operate the windings in series or in parallel, respectively;

g. connecting the triacs to a controller for regulating the operation of the triacs; and h. connecting the controller to a speed demand signal for determination of controller action.

18. The method according to claim 17 further comprising:

providing a fourth triac in the auxiliary winding line for putting the motor in an off mode.

19. A method of operating an induction motor according to claim 17 wherein:

the operational parameters include determining the triac or triacs to be operational and the firing delay of each operational triac.

20. A method of operating an induction motor according to claim 17 further comprising: programming delays in triac operation when switching from operation of the first triac to operation of the second and third triacs.

21. A method of operating an induction motor comprising:

a. providing a rotor, and a stator;

b. arranging the coils of the stator in main and auxiliary windings;

c. arranging first and second main windings in parallel with a power supply, each parallel winding leg being controlled on an opposing end thereof by a respective first and second switching mechanism, and providing a third switching mechanism in a series path between the main windings;

d. providing a controller for operating the switching mechanisms;

e. accepting a speed command at the controller;

f. translating the speed command to a speed setting level number;

g. determining if the current motor speed setting has changed;

h. when the current motor speed setting has changed, looking up operational parameters of the switching mechanisms; including which switching mechanism to fire and its firing delay; and i. operating the switching mechanisms accord according to the operational parameters.

22. A method of operating an induction motor according to claim 21 further comprising:

a. determining if the speed setting level number is equal to, greater than or less than a current motor speed setting;

b. incrementing the current motor speed setting if the speed setting level number is greater than the current motor speed setting;

c. decrementing the current motor speed setting if the speed setting level number is less than the current motor speed setting; and d. taking no action with regard to the current motor speed setting if the speed setting level number is equal to a current motor speed setting.

23. A method of operating an induction motor according to claim 21 further comprising:

providing a load known characteristics on the motor.

24. Apparatus for obtaining a variable speed AC induction motor operation comprising:

a. a rotor surrounded by a stator and connectable to a load;

b. the stator having auxiliary windings and further having main windings, the main windings controlled by switching mechanisms connected thereto for variable control of current through the main windings;

c. the switching mechanisms for variable control of current through the main windings being configured to run the main windings in a series or in a parallel configuration;

d. the firing rates of the switching mechanisms for variable control of current through the main windings being variably set by a controller to determine the speed of the motor and the series or parallel configuration operation of the main windings;

e. the controller connected to a speed demand unit for input of motor speed commands to the controller;

f. whereby, the controller varies the firing rate of the switching mechanisms for variable control of current therethrough in both series and parallel operation of the main windings according to the motor speed command from the speed demand unit to yield a variable speed AC induction motor.

* * * * *